United States Patent [19]
Taylor et al.

[11] Patent Number: 4,720,124
[45] Date of Patent: Jan. 19, 1988

[54] TELESCOPING JOINT

[75] Inventors: William M. Taylor, Houston; Thomas R. Schmitz, Katy, both of Tex.

[73] Assignee: Cameron Iron Works, Inc., Houston, Tex.

[21] Appl. No.: 761,692

[22] Filed: Aug. 2, 1985

[51] Int. Cl.[4] ............................................... F16L 27/06
[52] U.S. Cl. ..................................... 285/18; 285/165; 285/298; 285/381
[58] Field of Search ............... 285/298, 381, 347, 379, 285/108, 18, 165, 302, 114; 403/273, 31; 29/417

[56] References Cited

U.S. PATENT DOCUMENTS

| | | | |
|---|---|---|---|
| 2,992,479 | 7/1961 | Musser et al. | 403/31 X |
| 3,096,999 | 7/1963 | Ahlstone et al. | |
| 3,114,566 | 12/1963 | Coberly et al. | 285/18 |
| 3,494,642 | 2/1970 | Coberly et al. | |
| 3,717,920 | 2/1973 | Oliver et al. | |
| 4,011,918 | 3/1977 | Jurgens. | |
| 4,109,945 | 8/1978 | Manchester et al. | |
| 4,124,230 | 11/1978 | Ahlstone | 285/18 |
| 4,124,232 | 11/1978 | Ahlstone | 285/18 |
| 4,138,147 | 2/1979 | Manchester et al. | |
| 4,195,865 | 4/1980 | Martin | 285/165 X |
| 4,211,197 | 7/1980 | Baumgartner et al. | 403/273 |
| 4,298,221 | 11/1981 | McGugan | 285/381 |
| 4,341,484 | 7/1982 | Peterson et al. | |
| 4,371,198 | 2/1983 | Martin. | |
| 4,436,325 | 3/1984 | Miller | 285/18 |

FOREIGN PATENT DOCUMENTS

| | | | |
|---|---|---|---|
| 1141071 | 8/1957 | France | 285/114 |
| 2033518 | 5/1980 | United Kingdom | 285/381 |
| 2064041 | 6/1981 | United Kingdom | 285/18 |

Primary Examiner—Randolph A. Reese
Assistant Examiner—Peter M. Cuomo
Attorney, Agent, or Firm—Vinson & Elkins

[57] ABSTRACT

A subsea telescoping joint having an outer tubular member, and an inner tubular member, an internal serrated locking and metal-to-metal sealing surface within said outer tubular member, an external serrated locking and metal-to-metal sealing surface on the exterior of said inner tubular member, means sealing between the tubular members to provide a pair of fluid chambers between the members, means for supplying pressure fluid to said chambers, the locking and sealing surfaces having a slight interference fit which allows relative movement of the members with the presence of fluid pressure in said chambers and on relieving of such fluid pressure from said chambers the surfaces move into locking and metal-to-metal sealing engagement with each other. In one form of the invention the sealing means are at the same diameter so that there is no pressure force developed tending to extend or retract the joint and in another form the sealing means are at different diameters so that a force is developed responsive to the fluid pressure tending to extend the telescoping joint.

6 Claims, 7 Drawing Figures

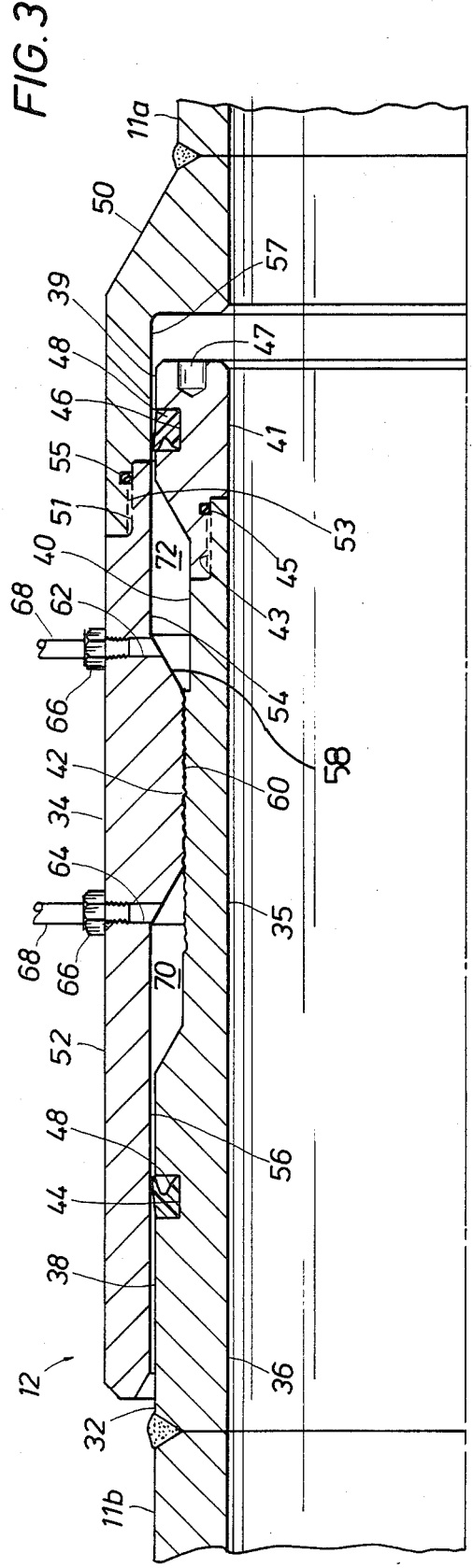
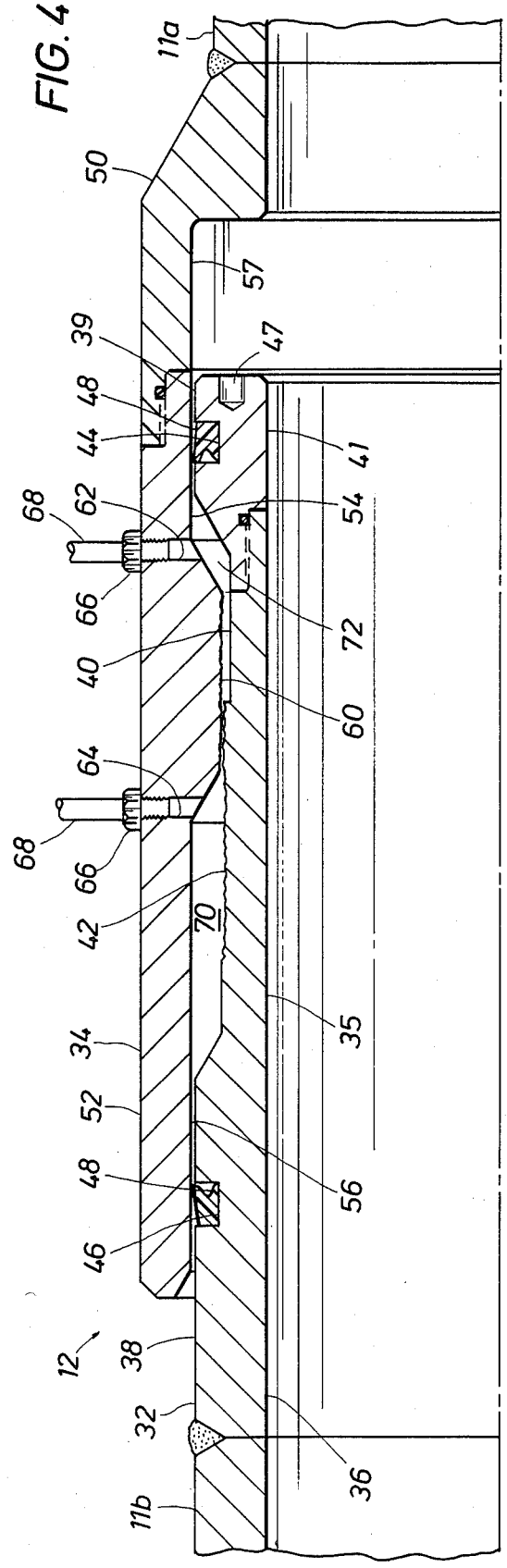

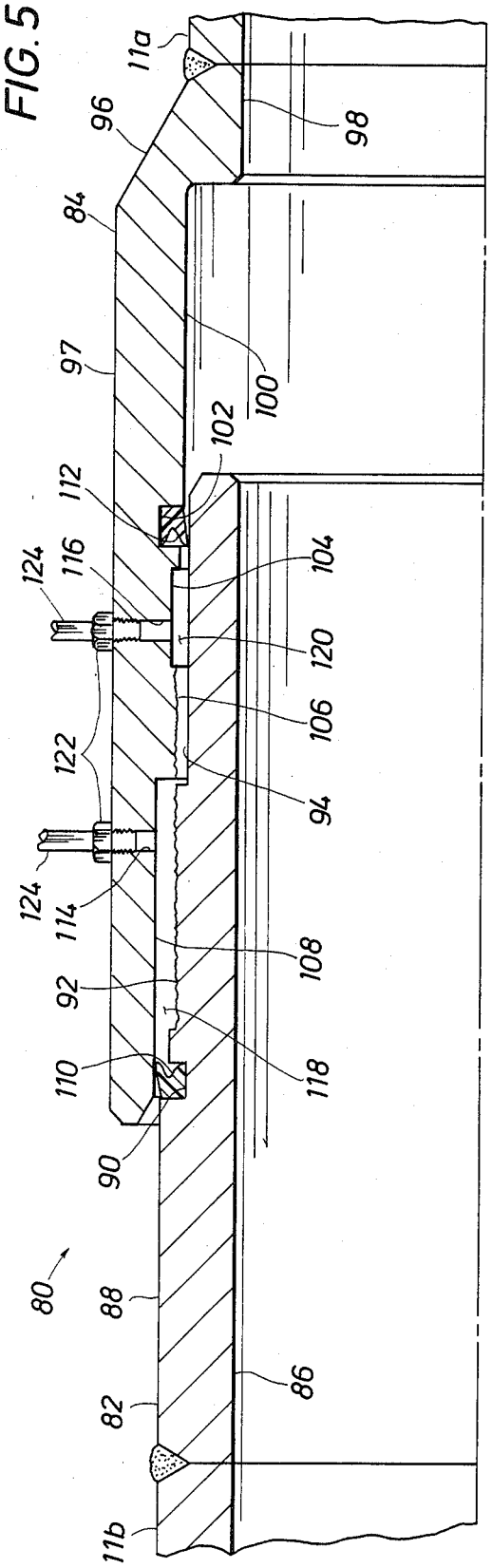
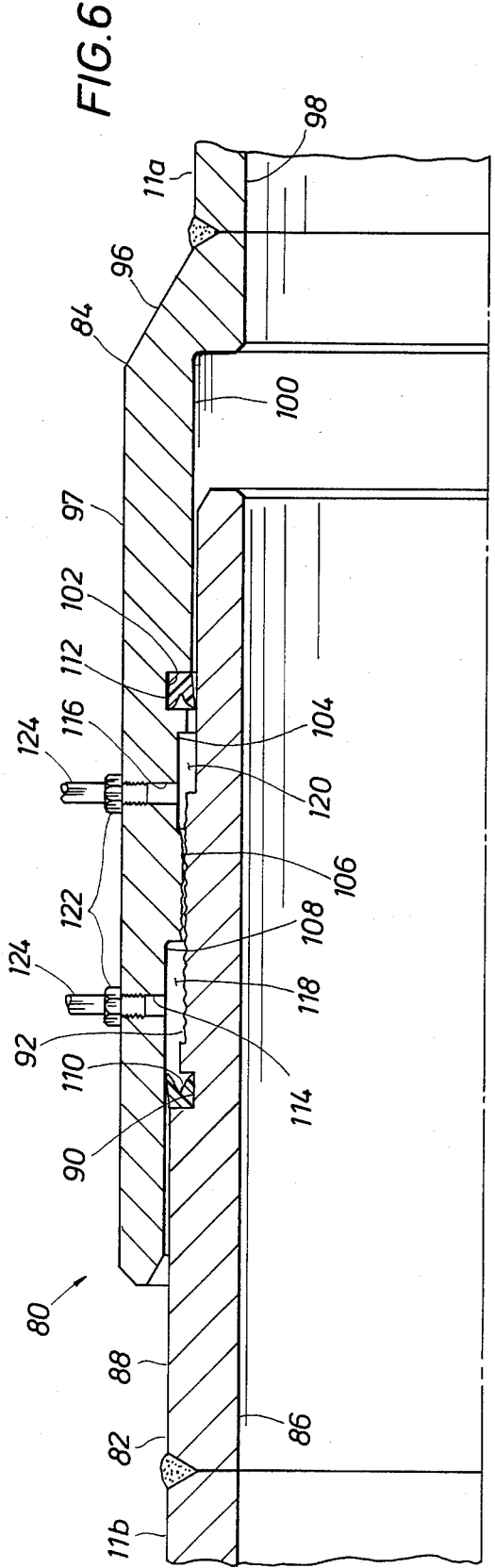

TELESCOPING JOINT

BACKGROUND

In some subsea applications, production from several subsea christmas trees flows through individual flowlines from each christmas tree to a central main gathering line on the ocean floor. As new wells are drilled and completed the flowlines from these wells are also connected into the main gathering line. Making a connection between the flowlines and the main gathering line is often accomplished by using an articulated piping system having flexible ball and socket joints as shown in U.S. Pat. Nos. 3,727,954 and 3,717,920 and remote collet type connectors as shown in U.S. Pat. No. 3,096,999. In making such connections the length of the connecting pipes can be compensated to some extent by introducing swivel joints at each end of the section and in its middle as shown in the copending application Ser. No. 741,269, filed on June 5, 1985, now U.S. Pat. No. 4,696,494. Such application disclosed an improved type of swivel joint which is adapted to be used to compensate for misalignment between the subsea lines which are to be connected.

Normally telescoping joints are provided with seals to contain the fluids within the interior of the joint from leaking to the exterior and to prevent entry of surrounding fluids into the joint. In making the subsea connections mentioned above, it is desired that the length of flowline used to make such connection be adjustable so that even with multiple swivel joints there is not any stress introduced into the flowline or into the lines to which it is connected by having the connecting flowline too short, too long, or not properly aligned.

Some of the prior subsea telescopic joints have been capable of extending and shortening the flowline or spool to be used in such connections but did not have a metal-to-metal seal of the cylindrical locking surfaces of the two members of the joint. An example of this type of telescoping joint are shown in U.S. Pat. Nos. 4,138,147, 4,371,198 and 4,109,945.

Also in the past it has been suggested to use fluid pressure to bring two surfaces into frictional engagement as disclosed in U.S. Pat. No. 4,341,484. U.S. Pat. No. 4,011,918 discloses the use of hydraulic fluid injected between a drill string stabilizer and its supporting tapered pin to release frictional engagement between the stabilizer and the pin.

SUMMARY

The present invention relates to an improved subsea telescoping joint which includes a first tubular member having an external metal cylindrical sealing and locking surface, a second tubular member having an internal metal cylindrical sealing and locking surface, means for sealing between the end of each of said members to define a chamber between said members on the sides of sealing and locking surfaces, means for introducing fluid under pressure into said chamber to unlock the metal-to-metal sealing and locking engagement of such surfaces, said surfaces having a slight interference fit and surface finishes which ensure metal-to-metal sealing engagement when pressure from said chamber is released.

An object of the present invention is to provide an improved subsea telescoping joint which both locks and seals with a metal-to-metal seal.

A further object is to provide an improved subsea telescoping joint which provides a very substantial length adjustment for a flowline spool to be inserted between a flowline leading from an individual christmas tree to a main gathering system.

Another object is to provide an improved subsea telescoping joint which is easily adjusted in length during subsea installation.

Still another object of the present invention is to supply an interconnecting subsea piping system which is substantially shorter and more readily installed than the prior art articulated subsea piping system.

BRIEF DESCRIPTION OF THE DRAWINGS

These and other objects and advantages of the present invention are hereinafter set forth and explained with reference to the drawings wherein:

FIG. 3 is a partial sectional view of one form of improved telescopic joint of the present invention with the joint in a partially retracted position.

FIG. 4 is a partial sectional view of the joint in FIG. 3 showing the joint in its extended position.

FIG. 5 is a partial sectional view of another form of improved telescopic joint of the present invention in its extended position.

FIG. 6 is another partial sectional view of the joint of FIG. 5 in a partially retracted position.

DESCRIPTION OF THE PREFERRED EMBODIMENTS

Figure 1:
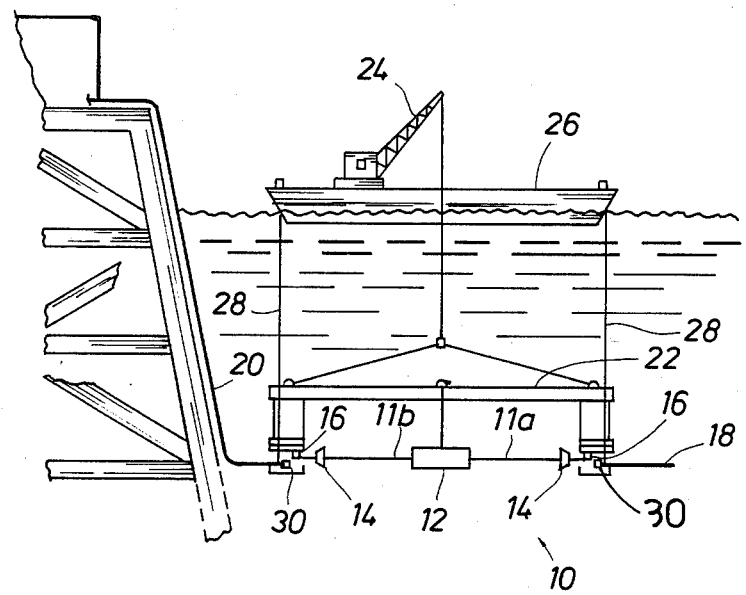
FIG. 1 is a schematic representation of a flowline spool with an improved telescoping joint of the present invention being lowered into position for connection in a subsea location.
Figure 2:
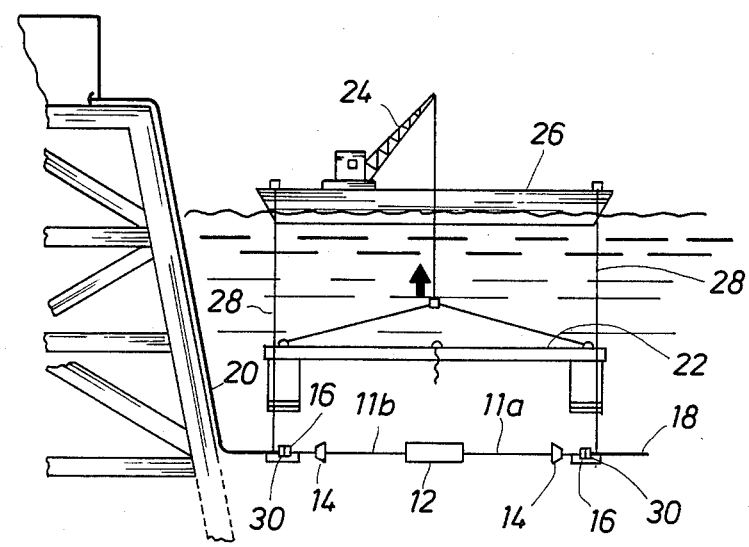
FIG. 2 is a similar schematic representation showing the flowline spool connected in the subsea location.
Figure 7:
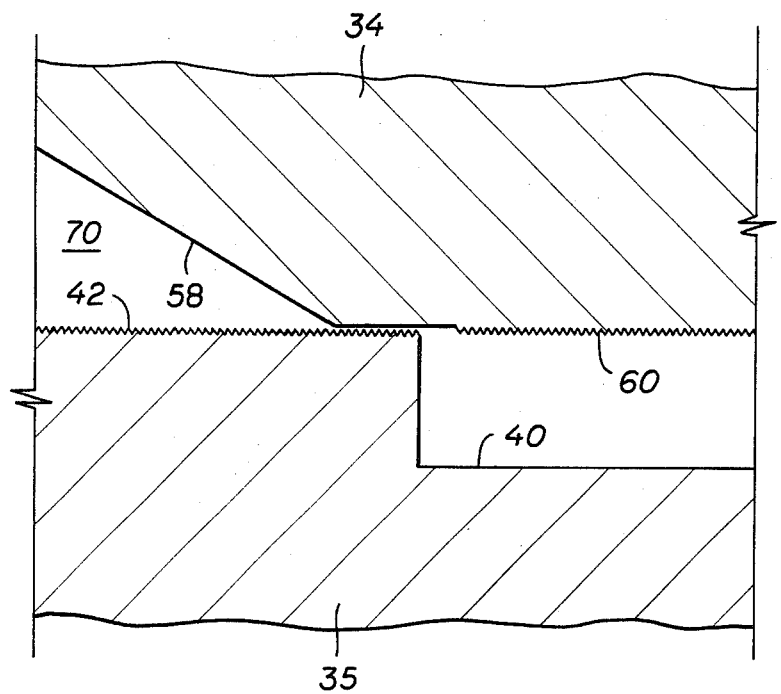
FIG. 7 is a greatly enlarged view of the sealing and locking surfaces of the improved joint.

As shown in FIG. 1, flowline spool 10 having telescoping joint 12 in its midsection with flowline sections 11a and 11b extending outward from each end of joint 12, swivels 14 on each end and remote connectors 16 on each swivel 14 for connecting to subsea flowline 18 and riser 20. Spool 10 is connected to strongback 22 which is lowered to the subsea location by crane 24 from floating structure 26. Spool 10 is guided by connection to guidelines 28 which lead to the ends of flowline 18 and riser 20, both of which are provided with suitable ends 30 for connection by connectors 16 such as collet flanges when remote connectors are collet connectors.

Spool 10 is lowered into position and telescoping joint 12 is adjusted as hereinafter described so that connectors 16 are in position to mate with ends 30. When connection has been made between connectors 16 and ends 30, then telescoping joint 12 is locked into position so that spool 10, is sealed and its length is fixed. Thereafter strongback 22 is disconnected from spool 10 and guidelines 28 are disconnected from flowline 18 and riser 20.

Telescoping joint 12, shown in FIGS. 3 and 4 is the preferred form of joint of the present invention and includes inner tubular member 32 and outer tubular member 34. Inner tubular member 32, which is secured to flowline section 11b of spool 10 as by welding, includes sleeve 35 which is generally tubular in shape having central bore 36, exterior cylindrical surface 38 on its inner end and recessed cylindrical surface 40 located axially exterior from surface 38 and threaded reduced diameter 43. Hub 41 threadedly engages diameter 43 and is sealed thereto by seal 45. Hub 41 includes exterior diametrical surface 39, which is essentially the same radial extent as surface 38, so that recess 40 is located between surfaces 38 and 39. Hub 41 also includes spanner wrench holes 47, whereby a spanner wrench (not shown) may be used to threadedly engage hub 41 to diameter 43. The central portion of recess 40 includes sealing and locking surface 42 which has a surface finish to provide metal-to-metal sealing which is not a smooth finish but rather a lightly serrated finish. Grooves 44 and 46 in surfaces 38 and 39 include seal rings 48. Outer tubular member 34 includes hub 50 which is suitable connected to flowline section 11a of spool 10 as by welding, and sleeve 52 which is connected and sealed to hub 50. The interior of sleeve 52 includes bore 54 at one end and bore 56 at its other end and inward projection 58 therebetween. The end of sleeve 52 with bore 54 has threaded surface 51 located exterior of bore 54. Hub 50 includes threaded surface 53 for engaging surface 51 of sleeve 52 and seal 55 for sealing therebetween. Hub 50 also includes bore 57 which is essentially the same diameter as bore 54 of sleeve 52 and forms an extension thereof. Projection 58 has inner sealing and locking surface 60 which has a surface finish to provide metal-to-metal sealing. Such surface is not a smooth finish but rather a lightly serrated finish similar to the finish on surface 42. The diameters of surfaces 42 and 60 have a slight interference fit so that they are not movable with respect to each other. Ports 62 and 64 extend through sleeve 52 at each side of projection 58 as shown and are provided with suitable fittings 66 to which lines 68 are connected for supplying fluid under pressure to the interior of sleeve 52. Seal rings 48 seal against the surfaces of bores 54, 56 and 57. Since they seal against surfaces having the same diameter, the joint is effectively balanced, that is, it does not have any extending or retracting net forces developing as a result of pressure supplied to the interior of the sleeve 52.

As shown in FIG. 3, joint 12 is locked and sealed. To release joint 12 from the locked position it is only necessary to supply fluid under pressure through hoses 68 to ports 62 and 64. When sufficient pressure is introduced into chambers 70 and 72 between members 32 and 34 and opposite sides of projection 58, the diameters thereof changes sufficiently so that there is no longer an interference fit but rather a slight clearance. With pressure in chambers 70 and 72 members 32 and 34 are movable with respect to each other so that joint 12 can be moved from a contracted position shown in FIG. 3 to the extended position shown in FIG. 4. Joint 12 is locked in position by relieving the fluid pressure from chambers 70 and 72. Further, because of the serrated finish of surfaces 42 and 60, the engagement between such surfaces provide a locking of joint 12 and also a metal-to-metal seal between inner and outer tubular members 32 and 34. Also, ports 62 and 64 may be used to test the effectiveness of the metal-to-metal seal between surfaces 42 and 60. This may be accomplished by relieving pressure from one of ports 62 and 64 and thereafter supplying fluid pressure to the other of such ports with suitable means, such as a pressure gauge connected to the relieved port, to provide an indication of the pressure in the relieved port. Thus, any increase in the pressure indicates a leakage across the metal-to-metal seal which is intended to be provided by the engagement of surfaces 42 and 60. In pressure testing of the seal substantially less fluid pressure is utilized than the pressure level needed to release the locking and sealing engagement of surfaces 42 and 60.

Telescoping joint 80, as shown in FIGS. 5 and 6, is a modified form of the present invention and includes inner tubular member 82 which is secured to flowline section 11b of the flowline spool 10 and outer tubular member 84 which is secured to flowline section 11a of the spool 10. Inner tubular member 82 includes central bore 86, exterior surface 88, groove 90 at the end of surface 88, serrated sealing and locking surface 92 which has a smaller diameter than surface 88 and exterior end sealing surface 94 which has a smaller diameter than surface 92. Outer tubular member 84 includes hub portion 96 having central bore 98 on the end connecting to flowline section 11b and sleeve portion 97 with bore 100. Groove 102 is near the end of bore 100 as shown. Surface 104 has a larger diameter than bore 100. Serrated metal-to-metal sealing and locking surface 106 is on the interior of sleeve portion 97 and has a diameter slightly smaller than the diameter of surface 92 of inner tubular member 82 so that there is a slight interference fit between the two sealing and locking surfaces 92 and 106. Tubular member 84 has bore 108 which is on its end that is opposite to the hub portion 96 and is larger in diameter than the exterior surface 88 of member 82. Seal ring 110 is positioned in groove 90 and seals against the surface of bore 108. Sleeve portion 97 includes groove 102 with seal ring 112 positioned therein which seals against surface 94 of inner tubular member 82. Ports 114 and 116 extend through outer tubular member 84 to communicate with chamber 118, between surfaces 92 and 108, and chamber 120, between surfaces 94 and 106, at opposite sides of surface 106. Suitable fittings 122 are connected into bores 114 and 116 and lines 124 connect to fittings 122 to supply fluid under pressure to the interior of outer tubular member 84.

The operation of joint 80 is similar to the operation of joint 12 in that the introduction of fluid under pressure into chambers 118 and 120 between the inner and outer tubular members 82 and 84 causes an unlocking of the engagement of the surfaces 92 and 106 so that joint 80 may be extended to the position shown in FIG. 5 or retracted to the position shown in FIG. 6. Once joint 80 is positioned as desired, the pressure is relieved from chambers 118 and 120. The relief of pressure in chambers 118 and 120 causes surfaces 92 and 106 to engage in locking and metal-to-metal sealing contact. This not only locks joint 80 in the desired position but also provides a metal-to-metal seal between inner and outer tubular members 82 and 84.

Ports 114 and 116 can also be used to test the effectiveness of the metal-to-metal seal of surfaces 92 and 106 by supplying less than unlocking pressure to one port and sensing, at the other port, any pressure leakage into the other chamber.

Further, it should be noted that the effective diameters of seals 110 and 112 are such that there is an effective pressure force created when fluid pressure is supplied to chambers 118 and 120 which force tends to move joint members 82 and 84 to their extended position. This pressure assist in extension is expected to be helpful to divers attempting to make the final connection of flowline spool 10 in place between subsea flowline 18 and riser 20.

In the prior art articulated subsea piping system a length of 150 feet of piping would be used for a connection which can be made by 90 feet of piping by use of the present invention.

What is claimed is:

1. A reusable subsea telescoping joint adapted to be installed in a subsea line and to be adjustable in length comprising
    an inner tubular member having an external serrated cylindrical locking surface intermediate the ends of said inner tubular member,
    an outer tubular member surrounding a portion of said inner tubular member and having an integral internal serrated cylindrical locking surface intermediate the ends of said outer tubular member,
    means for sealing between said tubular members to provide a pressure chamber on at least one side of said locking surfaces,
    at least one port extending through said outer tubular member communicating with said chamber,
    the diameter of said locking surfaces having a slight interference fit whereby relative movement of said surfaces is inhibited until fluid pressure is supplied to said port to separate said locking surfaces allowing relative movement of said surfaces to lengthen or shorten said joint.

2. A subsea telescoping joint according to claim 1 wherein
    said locking surfaces being lightly serrated to ensure locking and a metal-to-metal sealing engagement when engaged without pressure in said chamber.

3. A subsea telescoping joint according to claim 1 wherein
    said outer tubular member has an inner projection with an inner surface being said internal locking surface, and
    said inner tubular member having a recess on its exterior, the recess surface being said external locking surface.

4. A subsea telescoping joint according to claim 1 wherein
    said sealing means are positioned to seal at the same diameter to provide a pressure balancing of said joint.

5. A subsea telescoping joint according to claim 1 wherein
    said sealing means are positioned to seal at different diameters to provide an internal force responsive to pressure in said chamber tending to extend said joint.

6. A subsea telescoping joint according to claim 1 including
    a chamber on each side of said locking surfaces, and
    a pair of ports through said outer tubular member, one on each side of said internal locking surface, communicating with said chambers.

* * * * *